Patented Dec. 15, 1925.

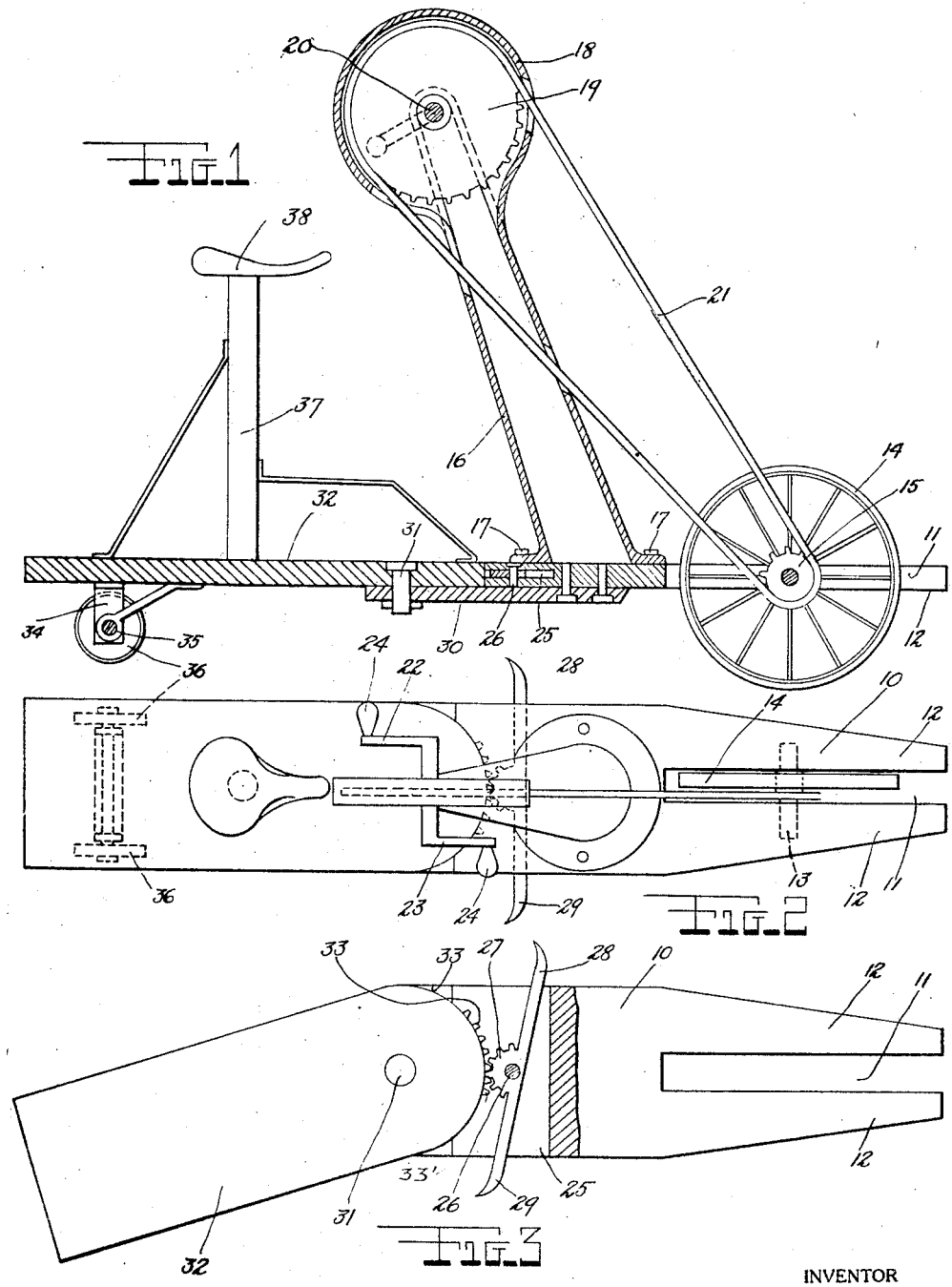

1,565,817

UNITED STATES PATENT OFFICE.

PAUL SCHIMMEL, OF NEW YORK, N. Y.

VELOCIPEDE.

Application filed January 9, 1925. Serial No. 1,357.

*To all whom it may concern:*

Be it known that I, PAUL SCHIMMEL, a citizen of Germany, residing at New York, in the county of New York and State of New York, have invented certain new and useful Improvements in Velocipedes, of which the following is a specification.

The main object of this invention is to provide a toy vehicle for children having a combined novel characteristic of a hand propelled vehicle, a seat for the support of a person, and an articulated body, the rear portion of which has a seat provided thereon.

Another object of the invention is to provide a velocipede for children in which an articulated body is provided with a steering means which cooperates with the joined portions of the articulated body to displace the alignment of the rear body so that turning or steering becomes possible.

The above and other objects will become apparent in the description below, in which characters of reference refer to like-named parts in the drawing.

Referring briefly to the drawing, Figure 1 is a sectional elevational view of the velocipede.

Figure 2 is a top plan view of the same.

Figure 3 is a top plan view of the articulated body, a portion thereof being shown in section to clearly illustrate the steering mechanism.

Referring in detail to the drawing, the numeral 10 indicates the forward platform of the articulated body. This forward platform is provided with a relatively wide and large slit 11 which divides said platform into a pair of forked arms 12. Spanning the slit intermediate its length, is a spindle 13 which is mounted in the forked arms 12 and rotatably supports a wheel 14 on the side ends of which a sprocket wheel 15 is attached. Rearward of the slit 11, an inclined pedestal 16 is rigidly mounted on the surface of the forward body 10 by bolts 17. This pedestal is formed into a hollow drum 18 at its upper end and in which a relatively large sprocket wheel 19 is rotatably mounted on a shaft 20. Rotation of the sprocket wheel 19 is communicated to the sprocket wheel 15 attached to the wheel 14 thru a sprocket chain 21 which courses downwardly at an inclined angle. The ends of the shaft 20 project outwardly from the hollow drum 18 and are formed into cranks 22 and 23 which extend in opposing directions and have handles 24 attached to their outer ends. To the rear of the pedestal base, a horizontal recess 25 is formed in the forward platform 10, and intermediate the width of the recess, a pivot stud 26 is mounted. This pivot stud 26 rotatably anchors the sector gear 27 from which steering arms 28 and 29 generate tangentially in opposite directions and project outwardly from the platform 10, the projecting ends being curved rearward so that the feet of the manipulator of the vehicle will not slide therefrom. An extension 30 is attached to the bottom of the platform 10 and projects rearwardly. This extension has an opening therein in which a king bolt 31 is secured. The body of the vehicle is articulated or joined by providing a second rear platform 32 which has a semi-circular forward end 33 and is provided with an opening in which an upper end of the king bolt 31 is mounted. This semi-circular forward end 33 of the rear platform has a plurality of teeth 33′ extending therefrom which engage and mesh with the teeth of the sector gear 27 mounted in the recess 25 of the forward platform 10. The rear platform 32 is provided with a bracket 34 at its rear end and in this bracket, an axle 35 is mounted. The axle extends across the width of the rear platform and has a pair of wheels 36 rotatably mounted thereon. Between the king bolt and the bracket 34, a post 37 extends vertically upward and supports a seat 38 upon which the manipulator is seated.

This vehicle is of the propelled self-balanced type and is operated in the following manner. The child sits upon the seat 38, places the feet individually on the steering arms 28 and 29 and with the hands grasps the handles 24 of the crank arms 22 and 23. By rotating the shaft 20 thru means of the crank arms 22 and 23, the sprocket wheel 19 is rotated and transmits said rotation to the sprocket wheel 15 thru the chain 21. As the sprocket wheel 15 is attached to the face of the driving wheel 14, forward or rearward travel of the vehicle is attained. When steering the vehicle, either of the arms 28 or 29 are alternately moved forwardly or rearwardly so that the sector gear 27, integral with these arms, is rotated about the pivot bolt 26. In rotating the sector gear, the rear portion of the articulated body 32 is depressed out of alignment with the forward platform 10 and the wheels 36 of the rear platform are moved sidewise and at an angle to the plane of motion of the driving wheel 14, thus steering the vehicle. Rotating the rear body is accomplished by the cooperation of the teeth 33' on the semi-circular forward end of the rear platform 32 meshing with the sector gear 25.

I claim:—

1. A vehicle comprising an articulated body, a pedestal on said body, a driving wheel on the front of said body, hand propelled means mounted in said pedestal for rotating the driving wheel, and a seat on the rear of said body behind the pedestal.

2. A vehicle comprising an articulated body, said body comprising a forward and rear platform arranged end to end, the forward platform having forked arms, a driving wheel mounted between said forked arms, a pedestal, hand operated means in said pedestal for rotating the driving wheel, and foot actuated means in said forward platform for rotating the rear platform out of alignment with the forward platform.

3. A vehicle comprising a forward and rear platform forming a body, said platforms being aligned end to end, the forward platform having a recess at its rear, the rear platform having a semi-circular forward end, and means in said recess of the forward platform cooperating with the rear platform to rotate the rear platform at an angle to the forward platform.

4. In a vehicle, an articulated body comprising a forward and rear platform, a king bolt in said extension connecting the forward and rear platforms end to end, the forward platform having a recess at its rear end, the rear platform having a semi-circular forward end adjacent said recess, and a sector gear mounted in said recess cooperating with the rear platform for rotating the latter to an angular position with respect to the forward platform.

5. In a vehicle, an articulated body comprising a forward and rear platform, the forward platform having a recess on its rear end, the rear platform having a semi-circular forward end, teeth extending from the forward end of the rear platform, a sector gear pivoted in said recess and cooperating with the teeth on the rear platform to rotate the latter to an angle with respect to the forward platform, and a king bolt connecting the forward and rear platforms.

In testimony whereof I affix my signature.

PAUL SCHIMMEL.